United States Patent Office 3,535,376
Patented Oct. 20, 1970

3,535,376
FREE-FLOWING UREA
David E. Scheirer, Chester, and Robert R. Cruse, Colonial Heights, Va., assignors to Allied Chemical Corporation, New York, N.Y., a corporation of New York
No Drawing. Continuation-in-part of application Ser. No. 643,844, June 6, 1967. This application Jan. 16, 1968, Ser. No. 698,104
Int. Cl. C07c *127/00*
U.S. Cl. 260—555                                3 Claims

ABSTRACT OF THE DISCLOSURE

A process for forming non-caking urea particles by mixing urea particles with 0.1–4.0% by weight of the urea of long chain organic acids having 10–22 carbon atoms at 50–90° C. and agitating the urea particles so as to form urea clathrates on the surface of the particles. The hot urea particles having a coating of clathrate are then mixed with about 0.3–1.0% by weight, based on the urea, of finely divided kaolin or yellow ocher, preferably a mixture consisting of about equal proportions of finely divided kaolin and yellow ocher, and the resulting coated urea is cooled to ambient temperature.

---

This application is a continuation-in-part of our co-pending U.S. application Ser. No. 643,844 filed June 6, 1967, now abandoned.

BACKGROUND OF THE INVENTION

This invention relates to the production of free-flowing urea and in particular to a process of coating urea particles with urea clathrates, kaolin and yellow ocher and the resultant products therefrom.

Numerous finely divided and coarse solid industrial products have a troublesome tendency to cake or "set" during storage due to agglomeration of the particles. This makes such products difficult to handle. This tendency is particularly pronounced in the case of water soluble and hygroscopic products. Among the inorganic compounds exhibiting this undesirable property could be listed the inorganic nitrates, particularly ammonium nitrate, and nitrogenous fertilizers in general. Among the organic compounds having this undersirable property could be listed urea and products containing urea.

Urea is difficult to handle because of its tendency to cake. On storing, particularly under pressure, the crystals or prills grow to greater aggregates and the product has to be crushed or often ground before use in fertilizer, ruminant feeds, and for other purposes.

In the past, attempts have been made to obtain a free-flowing product by means of various additions of so-called anticaking agents. For instance, attempts have been made to eliminate the above problems by treating the surface of the particles with agents which will either reduce the moisture uptake and/or mechanically prevent intimate contact of the particles.

Thus, it is known to coat urea crystals with basic magnesium carbonate and to mix prilled urea with a pulverulent material such as kaolin or kieselguhr. Other methods involve heat treatment to fuse the crystal surfaces and solvent treatment employing acetone as a surface-conditioning agent. Addition of organic compounds such as alkylaryl sulfonates has also been tried. However, an improved coating agent was needed, particularly a coating agent capable of a stronger binding to the urea.

More recent attempts have involved the addition of water-soluble surface active agents in order to decrease the surface tension of water and thus distribute any moisture evenly over the surface of the particles. This was predicated on the theory that the amount of water which gathered at the contact points of the particles by capillary force would be reduced and, likewise, the formation of crystal bridges.

It has also been proposed to treat urea with nitrogenous organic compounds such as p-toluidine and p-anisidine and with alkyl amines such as octadecyl amine. This treatment apparently results, however, in the formation of a substituted urea on the surface of the urea particles by reaction with the additives mentioned.

It is also known to let the melt from the urea synthesis drop into oil, whereby one might expect a urea/hydrocarbon complex to form on the surface of the urea particles, thus imparting improved storage properties to the product. However, this surface coating has a very poor abrasive strength and as soon as it becomes loosened the anticaking effect is markedly decreased.

It is one object of the present invention to produce free-flowing urea.

It is an additional object of the present invention to produce free-flowing urea by a simple and economical process.

It is a further object to form on urea particles an anticaking coat which has strong abrasive strength.

SUMMARY OF THE INVENTION

In accordance with the present invention, free-flowing urea with good anticaking properties is produced by contacting urea particles with 0.1–4.0% by weight of the urea of molten organic acids, while continually agitating the urea particles at a temperature in the range of 50–90° C. The urea particles product has good anticaking properties as compared to the original untreated urea particles.

In a preferred method of operation, free-flowing urea with good anticaking properties is produced by a process comprising:

(a) Contacting urea particles with about 0.3–0.5% by weight, based on the urea, of molten organic acids having 10–22 carbon atoms with chain lengths of at least 8 carbon atmos at a temperature within the range of about 50–90° C. while agitating said urea particles; and (b) Adding about 0.3–1.0% by weight, based on the urea, of a mixture containing substantial proportions of finely divided kaolin and yellow ocher to the urea particles with continued agitation.

Inclusion compounds, as discussed herein, are substances in which a molecular structure encloses other molecules or atoms, essentially by physical, rather than chemical means. Clathrates are inclusion compounds in which the enclosed molecular structure fits into separate chambers within a crystal lattice in the host compound. When the size and shape of the cavities and structures match, a combination of appreciable strength can occur.

The urea used in accordance with this invention may be either crystalline or prilled. It may consist, for example of any type of urea which has been heretofore used as a fertilizer, in mixed fertilizers, and for the manufacture of ruminant feeds. This comprises urea of a wide range of particle sizes, water content, etc. The exact properties of the urea are not critical to the present invention.

Solid, normal hydrocarbons, acids, esters, alcohols, aldehydes, amines, amides, sulfides, mercaptans, ethers and ketones are known to form urea adducts or clathrates. However, only long-chain organic acids have been found to give superior results in the process of the present invention. We normally use organic acids having 10–22 carbon atoms with chain lengths of at least about 8 carbon atoms. Some branched chain acids and acids containing cyclic structures may be used provided there is a sufficiently long straight chain in the molecule. Particularly suitable clathrate-forming acids are oleic acid, stearic acid, palmitic acid and tall oil fractions containing fatty acids such as oleic and linoleic acids. Mixtures of such acids may also be used.

Straight-chain compounds other than organic acids may be utilized in the present process but are much less effective. Clathrates of urea and cetyl alcohol, carnauba wax (a straight chain ester containing 50–52 carbon atoms), and low molecular weight polyethylene have been tried with relatively poor results as compared with long-chain organic acids.

It is most advantageous to coat the urea particles with the clathrate-forming organic acid at a temperature higher than the melting point of the acid, generally at temperatures of 50–90° C. and preferably at temperatures of 65–85° C. For a good coating with relatively small amounts of organic acid, it is important that the acid be added at a temperature above its melting point with adequate agitation or stirring of the urea particles. Furthermore, the heating temperature range must be below the melting point of urea. It is not desirable to add the acid to a smaller part of the urea and then admix this portion with the bulk of the urea. Apparently, after the clathrate coating is formed, it is not readily transferred to another untreated particle. To obtain the desired anticaking effect, generally 0.1% by weight based on the urea must be used. An amount of acid greater than about 4.0% based on the weight of the urea will not result in the urea particles having a further improved anticaking effect. Preferably, 0.3–2.0% by weight based on the urea of organic acid should be used. Small amounts of organic acid, generally 0.3–0.5% by weight based on the urea, have been found effective and from an economic consideration this is important since the clathrate-forming organic acid is the most costly component of the overall coating.

In order to increase the anticaking properties of the urea clathrate coated particles, they are mixed with powered absorptive solids such as diatomite, various clays or limestone. Preferably kaolin is added to the hot mixture at a temperature generally above about 45° C., preferably within the range of 50–70° C., and the mixture is allowed to cool with agitation. The chief advantage of using kaolin is that relatively smaller amounts of organic acids may be used with good effect. In a more preferred operation the urea clathrate coated particles are mixed with powdered kaolin and yellow ocher desirably mixed in approximately equal proportions by weight. Generally, 0.3–1.0% by weight, based on the urea, of the kaolin-ocher mixture is added to the urea particles with agitation to form the desired product.

Kaolin, which can be used in the coating agent of this invention, is a clay whose essential constituent is the mineral gaolinite, a hydrated aluminum silicate. Kaolin is sold as an article of commerce under various trade names, such as Paragon Clay, Suprex Clay, Barden Clay, and Barnet Clay. A specification of the latter type, having a standard U.S. Screen mesh size of 98% through a 325 mesh screen, is given in the table below:

| Component: | Weight percent |
|---|---|
| $SiO_2$ | 45.37 |
| $Al_2O_3$ | 37.28 |
| $Fe_2O_3$ | 1.43 |
| $TiO_2$ | 2.05 |
| CaO | 0.05 |
| MgO | 0.12 |
| $Na_2O$ | 0.21 |
| $K_2O$ | 0.12 |
| Loss on ignition | 13.41 |

The loss on ignition is essentially all chemically combined water.

Generally, 0.1–2.0% and preferably 0.3–1.0% by weight of the urea of kaolin is added to the urea particles with agitation to form the desired product. The kaolin used must be finely divided such that generally at least 50% and preferably at least 90% passes through a 325 mesh screen.

Yellow ocher, the other coating agent of this invention, is an earthy ore of iron whose essential constituent is the mineral limonite. Yellow ocher is sold as an article of commerce under various trade names such as Chinese yellow, English ocher, Oxford ocher, French ocher and Peruvian ocher. Yellow ocher is generally used as a pigment. A typical sample of Peruvian ocher, in addition to iron oxide the major constituent, analyzed as follows:

| Component: | Weight percent |
|---|---|
| $SiO_2$ | 0.75 |
| MgO | 0.01 |
| MnO | 0.10 |
| PbO | 0.002 |
| $Al_2O_3$ | 0.40 |
| $MoO_3$ | 0.002 |
| $V_2O_3$ | 0.005 |
| CuO | 0.003 |
| ZnO | 0.10 |
| CaO | 0.10 |

PREFERRED EMBODIMENTS

In the following examples of the invention, the tendency of caking of the urea was determined by a storage test involving storage under pressure. Under conditions of this test, untreated prilled or crystalline urea caked to a hard lump in 1–2 days.

Storage test

The apparatus of the storage test consisted of a piece of 2-inch pipe, 4 inches long, cut in half lengthwise. The halves were held together by two sizes 32 adjustable hose clamps. A steel plug 1⅞ inches diameter, 3 inches long and weighing about 3 pounds and two 5-pound lead weights completed the assembly. With the halves clamped in place, the pipe was placed on a sheet of paper on a flat surface and filled to a depth of about 3 inches with the urea material to be tested (100–150 grams was usually required). The plug was inserted on top of the test material, and the two lead weights placed on top of the plug. The pressure produced was slightly higher than the pressure produced on the test bag in a standard 12-bag stack set test. The filled assembly was allowed to stand undisturbed for 84 hours (3.5 days). At the end of the test period, the assembly was carefully dismantled and the test material rated as follows:

(A) No lumps.
(B) Partial cake which breaks up at touch.
(C) Solid cake which breaks up easily on crushing by hand.
(D) Solid cake which breaks up with difficulty on crushing by hand.
(E) Solid cake which cannnot be crused by hand.

The following examples illustrate the preferred embodiments of the present invention without intending to limit the scope thereof.

EXAMPLE I

Three kilograms of 12 to 30 mesh prilled urea (U.S. Standard Screen size) was heated to 70° C. in an open rotating vessel. About 30 grams of melted stearic acid at about 70 C.° was charged to a pressure vessel of about 400-ml. capacity fitted with a valve and a 0.50-gallon per hour fuel oil furnace nozzle. The pressure in the vessel was increased to about 225 p.s.i.g. with nitrogen and the hot, molten stearic acid was sprayed onto the heated urea in the rotating vessel. Spray time was about one minute. Heating and agitation were continued a few minutes until the mixture was free-flowing. The product on cooling gave an A rating in the storage test. When this experiment was carried out under the same conditions but using 15 grams of stearic acid instead of 30 grams, the product gave a B rating in the storage test.

EXAMPLE II

Three kilograms of 12 to 30 mesh prilled urea was heated to 70 C. in a rotating vessel. About 15 grams of melted stearic acid at 70° C. was charged to a pressure vessel of about 400-ml. capacity fitted with a valve and a 0.50-gallon per hour fuel oil furnace nozzle. The pressure in the vessel was increased to about 225 p.s.i.g. with nitrogen and the hot, molten stearic acid was sprayed onto the heated urea in the rotating vessel. Spray time was about one minute. Heating and rotation of the mixture was continued for a few minutes until the mixture became free-flowing. Next 15 grams of finely divided kaolin clay was added and rotation was continued an additional 15 minutes while the product was cooled. The kaolin adhered strongly to the surface of the particles. The product gave an A rating in the storage test.

EXAMPLE III

Nien grams of a commercially available tallow fatty acid, containing approximately 50% oleic acid, 30% stearic acid, and 15% palmitic acid was sprayed molten at about 85° C. from a pressurized 400-ml. bomb onto 3 kilograms of 12 to 30 mesh prilled urea that had been heated to 70° C. and agitated or tumbled in an Erweka pill coater apparatus. Spraying time was less than one minute. The mixture became free-flowing in about one minute of additional agitation. Nine grams of finely powdered kaolin clay was then added to the hot urea mixture and the mixture was tumbled an additional ten minutes and cooled. The product gave an A rating in the storage test.

EXAMPLE IV

Three kilograms of crystal urea was passed through a 20-mesh screen to break up all large lumps. The material was transferred to a rotating-type pill coater apparatus and heated to 70° C. with agitation. Thirty grams of a crude tallow fatty acid of the same composition as Example III was sprayed at 80° C. onto the heated urea from a heated pressurized bomb. Spraying time was about 2½ minutes. Sixty grams of kaolin was added to the hot, treated crystal urea. This mixture was agitated 15 minutes, then cooled to ambient temperature. The product after cooling gave an A rating in the storage test.

EXAMPLE V

In a rotating vessel, three kilograms of 12 to 30-mesh prilled urea (U.S. Standard Screen) was heated to 70° C. Fifteen grams of a commercial tall oil fraction containing 50–70% fatty acids, chiefly oleic and linoleic, was charged at about 70° C. to a 400-ml. stainless steel bomb fitted with a valve and a 0.50-gallon per hour fuel oil furnace nozzle. The system was pressurized to 200 p.s.i.g. with nitrogen and the molten tall oil acid at about 70° C. was sprayed onto the hot urea with agitation. Spraying required about 25 seconds. The mixture became free-flowing within 4 minutes, at which time 15 grams of kaolin was added and the mixture agitated an additional 15 minutes and cooled. The product gave an A rating in the storage test. The rating was also A when the time of the test was extended to two weeks.

EXAMPLE VI

Three kilograms of 12 to 30 mesh prilled urea was heated to 70° C. in a rotating vessel. About 12 grams of melted stearic acid at 70° C. was charged to a pressure vessel of about 400 ml. capacity fitted with a valve and a 0.50-gallon per hour fuel oil furnace nozzle. The pressure in the vessel was increased to about 225 p.s.i.g. with nitrogen and the hot, molten stearic acid was sprayed onto the heated urea in the rotating vessel. Spray time was about one minute. Heating and rotation of the mixture was continued for a few minutes until the mixture became free-flowing. Next, 7.5 grams of finely divided kaolin was mixed with 7.5 grams of yellow ocher pigment (Peruvian Ocher) and the mixture was added to the stearic acid coated urea and rotation was continued an additional 15 minutes while the product was cooled. The kaolin-ocher mixture adhered strongly to the surface of the particles. The product gave an A rating in the storage test. The rating was also A when the time of the test was extended to two weeks.

EXAMPLE VII

In a comparative test, Example I was repeated except that only stearic acid was used to coat the urea and no kaolin or yellow ocher was added. The product gave a B rating in the 84-hour storage test, and the rating was only D when the time of the test was extended to two weeks.

EXAMPLE VIII

Nine grams of a commercially available tallow fatty acid, containing approximately 50% oleic acid, 30% stearic acid, and 15% palmitic acid was sprayed molten at about 85° C. from a pressurized 400-ml. bomb onto 3 kilograms of 12 to 30 mesh prilled urea that had been heated to 70° C. and agitated or tumbled in an Erweka pill coater apparatus. Spraying time was less than one minute. The mixture became free-flowing in about one minute of additional agitation. Next, 9 grams of finely divided kaolin was mixed with 15 grams of yellow ocher pigment (Peruvian Ocher) and the mixture was added to the hot urea mixture and the mixture was tumbled an additional ten minutes at about 70° C. and cooled. The product gas a B+ rating in the storage test. The rating was also B+ when the time of the test was extended to 2 weeks.

Although certain preferred embodiments of the invention have been disclosed for purpose of illustration, it will be evident that various changes and modifications may be made therein without departing from the scope and spirit of the invention.

We claim:
1. A process of producing free flowing urea with good anticaking properties comprising:
   (a) contacting urea particles with about 0.3–0.5% by weight, based on the urea, of a molten organic acid selected from the group consisting of stearic acid, oleic acid, palmitic acid, linoleic acid, and mixtures of said acids, at a temperature within the range of about 50–90° C. while agitating said urea particles; and
   (b) adding to the urea particles with continued agitation about 0.3–1.0% by weight, based on the urea, of a mixture consisting of finely divided kaolin and yellow ocher in the weight ratio range of about 3/5 to 1/1.

2. The process as claimed in claim 1 wherein the organic acid is stearic acid and the yellow ocher is Peruvian Ocher.

3. The process as claimed in claim 1 wherein the mixture of finely divided kaolin and yellow ocher is added at a temperature of about 70° C.

References Cited

UNITED STATES PATENTS 2,773,858   12/1956   Gorin et al.

FOREIGN PATENTS 245,105   6/1960   Australia.

BERNARD HELFIN, Primary Examiner

M. W. GLYNN, Assistant Examiner